(12) United States Patent
Parisi et al.

(10) Patent No.: US 6,493,083 B2
(45) Date of Patent: Dec. 10, 2002

(54) METHOD FOR MEASURING COLOR REGISTRATION AND DETERMINING REGISTRATION ERROR IN MARKING PLATFORM

(75) Inventors: Michael A. Parisi, Fairport, NY (US); Michael P. Dirkx, Orlando, FL (US)

(73) Assignee: Xerox Corporation, Stamford, CT (US)

( * ) Notice: Subject to any disclaimer, the term of this patent is extended or adjusted under 35 U.S.C. 154(b) by 82 days.

(21) Appl. No.: 09/737,516

(22) Filed: Dec. 15, 2000

(65) Prior Publication Data

US 2002/0113968 A1 Aug. 22, 2002

(51) Int. Cl.⁷ .............................. G01B 11/00; G06K 7/10
(52) U.S. Cl. ........................................ 356/399; 356/121
(58) Field of Search ................................. 235/383, 380, 235/375, 381, 494, 462.01–462.25, 472.01, 472.02; 356/339, 124.5, 121; 358/513, 504; 346/184, 180

(56) References Cited

U.S. PATENT DOCUMENTS

| | | | |
|---|---|---|---|
| 5,287,162 A | | 2/1994 | de Jong et al. |
| 5,508,826 A | * | 4/1996 | Loyd et al. .................... 347/19 |
| 5,533,759 A | * | 7/1996 | Jeffers .......................... 283/57 |
| 5,571,380 A | * | 11/1996 | Fallon ....................... 162/168.2 |
| 5,574,527 A | | 11/1996 | Folkins |
| 5,625,857 A | * | 4/1997 | Shimada et al. ............. 118/691 |
| 5,731,839 A | * | 3/1998 | Panaro ......................... 348/180 |
| 5,748,221 A | | 5/1998 | Castelli et al. |
| 5,754,222 A | * | 5/1998 | Daly et al. .................... 348/184 |
| 5,754,683 A | * | 5/1998 | Hayashi et al. ............... 358/504 |
| 5,839,016 A | | 11/1998 | Folkins et al. |
| 5,854,882 A | * | 12/1998 | Wang .......................... 358/1.8 |
| 5,909,235 A | | 6/1999 | Folkins |
| 5,923,416 A | * | 7/1999 | Rosow et al. ............. 356/124.5 |
| 5,953,112 A | * | 9/1999 | Rosow et al. ................ 356/121 |
| 6,069,691 A | * | 5/2000 | Rosow et al. ............. 356/124.5 |
| 6,084,607 A | * | 7/2000 | Matsuda ....................... 347/19 |
| 6,198,549 B1 | | 3/2001 | Decker et al. |
| 6,424,432 B1 | * | 7/2002 | Koide et al. .................. 358/1.4 |
| 2001/0017619 A1 | * | 8/2001 | Takeuchi ..................... 345/204 |
| 2001/0035889 A1 | * | 11/2001 | Mikami ......................... 347/19 |
| 2002/0057470 A1 | * | 5/2002 | Koide et al. ................. 358/513 |
| 2002/0060709 A1 | * | 5/2002 | Arquilevich et al. .......... 347/19 |

* cited by examiner

*Primary Examiner*—Thien M. Le
(74) *Attorney, Agent, or Firm*—Fay, Sharpe, Fagan Minnich and McKee, LLP

(57) ABSTRACT

An image registration detection system in a multicolor marking platform determines registration of non-black colors using either the reflectance or the density of a test pattern as a measurement parameter. A method is also provided to determine the degree of registration error of each non-black color using the density of the test pattern. The present invention encompasses any marking platform that develops multicolor images in color separation layers that are in superimposed registration with one another, including electrophotographic and ink marking platforms. The apparatus and method disclosed require less measurement precision than prior color registration methods. Registration measurements can be performed on images formed on a photoreceptor, images transferred to an intermediate substrate, images transferred to a target substrate, or images fused to a target substrate. The method disclosed also requires less processing overhead than prior registration methods while providing a more precise method of estimating registration error.

31 Claims, 9 Drawing Sheets

METHOD FOR MEASURING COLOR REGISTRATION AND DETERMINING REGISTRATION ERROR IN MARKING PLATFORM

FIELD OF THE INVENTION

The present invention relates generally to a digital rendering system and, more particularly, to an apparatus and improved method for measuring color registration and determining registration error in a multicolor marking platform.

BACKGROUND OF THE INVENTION

A digital rendering system renders a digital image, consisting of electronic pixel data, to a human readable version of the image. Digital rendering systems typically include: 1) an input section, sometimes referred to as an image input terminal ("IIT") or a digital front end ("DFE"), 2) a controller, sometimes referred to as an electronic subsystem ("ESS") or an image processing system ("IPS"), and 3) an output section, sometimes referred to as an image output terminal ("IOT").

The input section either generates or translates one form of image data to digital image data that can be provided to the controller. The input section can be a scanner, individual computer, distributed computer network, electronic storage device, or any device capable of generating or storing the digital image. The controller processes the digital image data to create machine readable image data that is compatible with the output section. The controller also controls operations within the output section. The output section receives machine readable image data from the controller and produces a human readable version of the digital image. The output section can be a display device (e.g., cathode ray tube ("CRT") monitor), marking platform (e.g., copier or printer), electronic storage device, or any device capable of producing a human readable image. For marking platforms, the output section is sometimes referred to as a print or marking engine. Again in reference to marking platforms, the human readable image is created by depositing marking material on a print page. The print page is often a single sheet of white paper, however, numerous other materials are available. Two technologies commonly used in marking platforms are ink marking and toner marking. Ink-jet printers and offset printing presses are common examples of platforms that implement ink marking technology. Marking platforms that use toner marking include electrophotographic printers, copiers, and multifunction peripherals. Toner marking is also known as electrophotographic marking.

Generally, electrophotographic marking employs a charge-retentive, photosensitive surface, known as a photoreceptor. The photoreceptor is a photoconductive region on the surface of a rotating drum or moving belt. The photoconductive region may only have one imaging region or there may be multiple imaging regions, particularly for the belt. The electrophotographic process begins by applying a uniform charge to the photoreceptor. In an imaging and exposing step, a light image representation of a desired output is focused on the photoreceptor and discharges specific areas of the surface to create a latent image. In a developing step, toner particles are applied to the latent image, forming a toner or developed image on the photoreceptor. This toner image is then transferred to a print page. The toner particles are heated to permanently affix the toner image to the print page. Finally, the photoreceptor passes through a cleaning step to prepare it for another electrophotographic cycle.

The electrophotographic marking process outlined above can be used to produce color as well as black and white (monochrome) images. Generally, color images are produced by repeating the electrophotographic process to print two or more different image layers or color image separations in superimposed registration on a single print page. Commonly, full color copying or printing is provided by subtractive combinations of cyan, magenta, and yellow toner. Such color mixing to produce a variety of colors is called process color separation. To produce black, a combination of equal amounts of cyan, magenta and yellow toner layers are mixed, or a fourth black color toner layer may be used as a substitute. To extend the color gamut of the process color output, as in high fidelity copiers or printers, additional colors of toner (e.g., red, green, blue, or a customer-selectable color) may be used in combination with the three or four color separations. Alternatively, where the additional colored toner is not mixed with the process colors, referred to as spot color separation, the additional toner image layer is used to set off certain portions of text or graphics in the composite full color image. Color images can also be produced with two colors, such as black and red, by a highlight color copier or printer. Highlight color copying or printing can use process color separation to produce images similar to halftone or gray-scaled images or spot color separation to produce images with the two colors unmixed.

A multicolor electrophotographic process may be accomplished by either a multiple pass or single pass marking engine. Marking platforms with a multiple pass marking engine require less hardware and are generally easier to implement than systems with a single pass marking engine. However, systems with a single pass marking engine provide much greater throughput.

A multiple pass marking engine uses multiple cycles of the electrophotographic process described above, one cycle for each color separation. During each cycle, a toner image layer for one color separation is formed on the photoreceptor and transferred to an intermediate substrate or to the print page. In the multiple pass architecture described, the composite color image is accumulated on the intermediate substrate or the print page in successive electrophotographic cycles. In the case where the image is accumulated on an intermediate substrate, the composite toner image is transferred to the print page and then fused. In the case where the composite toner image is accumulated on the print page, the composite toner image is fused after the last color separation is transferred. In an alternate multiple pass architecture, the composite color image is accumulated on the photoreceptor in multiple cycles and, after the last toner image layer is developed on the photoreceptor, the composite toner image is transferred and fused on the print page.

A single pass marking engine employs multiple charging, imaging and exposing, and developing devices, one set for each color separation. In the single pass architecture, each color separation device set sequentially applies a toner image layer to the photoreceptor. Within each color separation device set, the electrophotographic steps of charging, imaging and exposing, and developing occur as described above. The composite color image is accumulated on the photoreceptor in a single electrophotographic cycle in the single pass marking engine. The composite color image on the photoreceptor is then transferred and fused to the print page.

Another type of single pass marking engine, often referred to as a tandem architecture, employs multiple photoreceptors in addition to the components of the previously described single pass marking engine. In the tandem architecture, each color separation has a set of charging, imaging and exposing, developing, and photoreceptor devices. Additionally, an intermediate transfer belt in the tandem architecture accumulates the individual toner images in a composite image in a manner not unlike the single photoreceptor in the previously described single pass architecture. Each photoreceptor sequentially transfers a toner image layer to the image area on the intermediate transfer belt. The composite color image is accumulated on the intermediate transfer belt in a single electrophotographic cycle and then transferred and fused to the print page.

While the color imaging techniques described above are discussed primarily in reference to electrophotographic marking, they are also applicable to ink marking and any other type of marking platform that creates a composite multicolor image by combining multiple color separation layers. In multicolor marking platforms that form and transfer individual color separation images in superimposed registration with one another, proper or precise registration of individual color images is usually an important and difficult problem. In order to deliver good quality composite color images, strict specifications are imposed on the accuracy with which a multicolor marking engine superimposes the various color separations. Registration errors, for example, can arise from motion errors of the image receiving members or from alignment errors of individual color separation development members. Techniques for improving registration in marking platforms often involve placement of registration indicia marks on a surface, detection of such marks, assessment of registration conditions, determining the degree of registration error when a misregistration condition exists, and controlling marking platform members to correct for registration errors. Detection systems, both mechanized and human are used to measure color registration and determine registration error in both the process direction and lateral (cross-process) direction.

One common way of improving color registration, as described in U.S. Pat. Nos. 5,287,162 and 5,748,221 and incorporated herein by reference, is to use bi-level detectors to measure the diffuse reflectance of a sequence of color registration marks, such as chevron marks. Process and lateral (cross-process) registration errors are determined from timing functions which relate the velocity of the image receiving members to the time centroids of the chevron marks pass by the detectors. This technique requires precise construction and alignment of detectors, precise measurement of diffuse reflectance, precise measurement or precise control of the velocity of image receiving members, and significant processing overhead to perform color registration measurements and determine registration error.

Another common way of improving color registration, as described in U.S. Pat. Nos. 5,574,527, 5,839,016, and 5,909,235 and incorporated herein by reference, is to use an optical sensor to measure the diffuse reflectance of either a sequence of color registration marks or a set of multicolor test patches. When color registration is detected using a sequence of color registration marks, process and lateral (cross-process) registration errors are determined based on timing functions much like the chevron marking technology described above. This technique requires precise measurement of diffuse reflectance, precise measurement or precise control of the velocity of image receiving members, and significant processing overhead to perform color registration measurements and determine registration error.

When color registration is detected with the optical sensor using a set of multicolor test patches, at least four, preferably ten, test patches are required for each non-black color to be registered. Each multicolor test patch is comprised of a set of color registration marks on a set of black registration marks in a predetermined registration condition. For each predetermined registration condition, an expected reflectance value and a registration error are known. At least two, preferably five, test patches are grouped to measure process registration. Likewise, at least two, preferably five, test patches are grouped to measure lateral (cross-process) registration. The actual reflectance of each patch is measured and compared to an expected value corresponding to the predetermined registration condition of the patch. Actual registration error in the process direction is estimated by comparing the measured and expected values for the process group of test patches and interpolating between or extrapolating from the known process registration error for the predetermined registration conditions. Actual registration error in the lateral (cross-process) direction is estimated in the same manner using the lateral (cross-process) group of test patches. This technique requires precise measurement of reflectance and significant processing overhead to perform color registration measurements and determine registration error.

Specular and diffuse reflectance are parameters that have been used for some time to control various processes in marking platforms, including toner concentration, developability, discrimination between opaque paper and transparencies, and gloss. However, the reflectance, and the corresponding density, of a test pattern has not will be been used as a parameter for controlling the registration of colors in a multicolor marking platform. Techniques for measurement of color registration and subsequent determination of registration error can be improved over prior techniques by employing an apparatus and method which employs the reflectance or density of multicolor test patterns as a control parameter. A need also exists for streamlining the color registration process by reducing the spatial precision necessary in measuring color registration in a multicolor marking platform and by reducing the processing overhead necessary for determining registration error.

BRIEF SUMMARY OF THE INVENTION

The present invention provides a multicolor marking platform with a color registration measurement system that uses either the reflectance or the density of a test pattern to determine the registration of one or more non-black colors in reference to a black color.

The present invention also provides a method of determining the degree of color registration error of the non-black colors in reference to the black color from the density of the test pattern.

An advantage of the present invention is that it is applicable to any marking platform that develops multicolor images in color separation layers that are in superimposed registration with one another, including but not limited to electrophotographic and ink marking platforms.

Another advantage of the present invention is that it requires less measurement precision than prior color registration methods.

Another advantage of the present invention is that its color registration measurements can be performed on images formed on a photoreceptor, on images assembled on an intermediate substrate, on images transferred to a target substrate, and on images fused to a target substrate.

Another advantage of the present invention is that it requires less processing overhead than prior color registration methods while also providing a more precise method of estimating color registration error.

BRIEF DESCRIPTION OF THE DRAWINGS

Other aspects of the present invention will become apparent from its description upon reference to the drawings provided. However, the drawings are only for purposes of illustrating embodiments of the present invention and are not to be construed as limiting the present invention.

DETAILED DESCRIPTION OF THE INVENTION

In describing the present invention, the following terms have been used:

"Complementary color" refers to the color found opposite the subject color on the color wheel. Mixing complementary colors produces an achromatic color. In reference to marking technologies, the achromatic color produced by mixing complementary colors is gray or black.

"Density" refers to the base ten logarithm of the ratio comparing the reflectance of a specimen surface to a perfectly reflective surface or to the light illuminating the specimen surface. Accordingly, density and reflectance are parameters that are mathematically transformable one to the other and vice versa.

"Fused target substrate" refers to a target substrate with a toner image that has been permanently affixed to it by a fusing station of an electrophotographic marking engine.

"Image marking member" includes charging and recharging stations, imaging and exposing stations, developing stations, transfer stations, and fusing stations for electrophotographic marking platforms and includes components associated with handling or transferring marking material in any other marking platforms.

"Image receiving member" includes a photoreceptor, a photoconductive region on a photoreceptor, an imaging region in the photoconductive region, a print page image area on a photoreceptor, a test pattern image area on a photoreceptor, an intermediate transfer belt, and a target substrate.

"Marking material" refers to material used to create a human readable image on a target substrate. Materials related to the present invention include toner and ink.

"Marking platform" refers to a digital rendering system that creates a human readable image on a target substrate using marking material. Examples of marking platforms include electrophotographic printers, copiers, and multi-function peripherals, ink-jet printers, and printing presses.

"Reflectance" refers to the energy reflected by a specimen surface. Reflectance and density are parameters that are mathematically transformable one to the other and vice versa.

"Registration" refers to the process of placing multiple color separations in proper alignment to form a multicolor image.

"Target substrate," in regard to multicolor marking platforms, refers to the substrate that is the final destination of the human readable version of a multicolor image. Typically, the target substrate is white paper, although many other materials are available including colored paper, transparencies, etc.

"Transferred target substrate" refers to a target substrate with an image that has been transferred to it by a transfer station of a marking engine.

Figure 1:
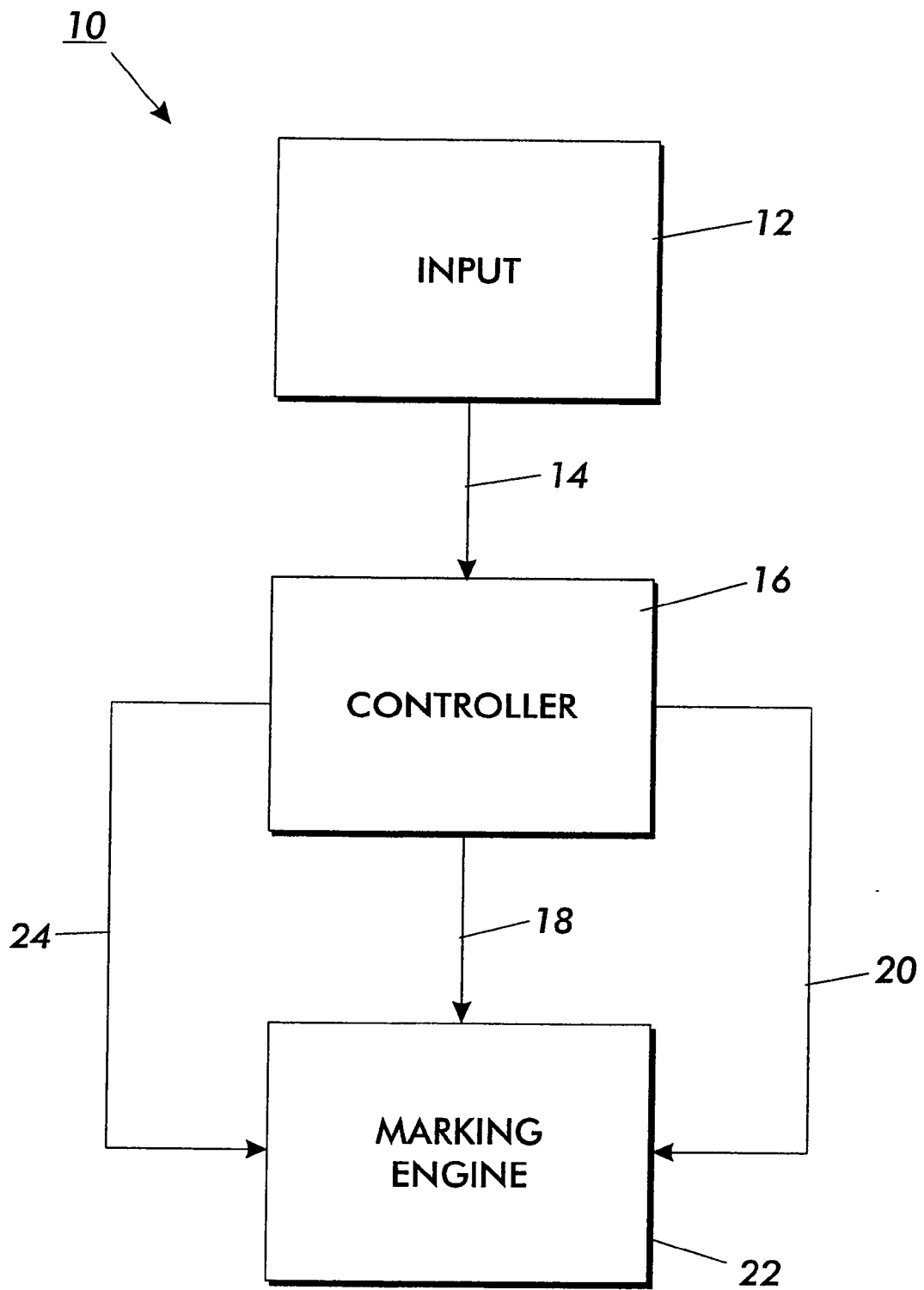
FIG. 1 shows a block diagram of a marking platform incorporating features of the present invention.

Turning now to the drawings, FIG. 1 is a block diagram of a marking platform 10 that incorporates features of the present invention. The marking platform 10 is comprised of an input 12, a controller 16, and a marking engine 22. The input 12 provides digital image data 14 to the controller 16. The input 12 can be a scanner, individual computer, distributed computer network, electronic storage device, or any device capable of generating or storing the digital image. The controller 16 processes the digital image data 14 to create machine readable image data 18 that is provided to and compatible with the marking engine 22. The controller 16 also provides control signals 20 that control operations (e.g., image receiving member transport speed, positioning of marking members, dispense of marking material, etc.) within the marking engine 22. The marking engine 22 receives machine readable image data 18 from the controller 16 and produces a human readable version of the digital image. The marking engine 22 contains sensors that detect certain parameters (e.g., reflectance of test pattern images, etc.) in the marking process and circuitry that scales and conditions the detected parameter measurements to create electrical signals. The electrical signals are provided to the controller 16 as feedback signals 24 to facilitate control of color registration within the marking platform 10.The marking engine 22 can use toner marking, ink marking, or any marking technology capable of producing a human readable image using marking material.

In marking technologies, the human readable version of the digital image is created by depositing marking material on a print page. The print page is often a single sheet of white paper, however, numerous other materials are available. Marking platforms that use ink as a marking technology include all the various forms of inkjet printing (e.g., ink, dye sublimation, wax, etc.) and all forms of printing presses that transfer images from inked type of plates to the target substrate. Ink-jet printers and offset printing presses are common examples of marking platforms that implement ink marking technology. Marking platforms that use toner marking technology include electrophotographic printers, copiers, and multifunction peripherals. Toner marking is also known as electrophotographic marking.

Figure 2:
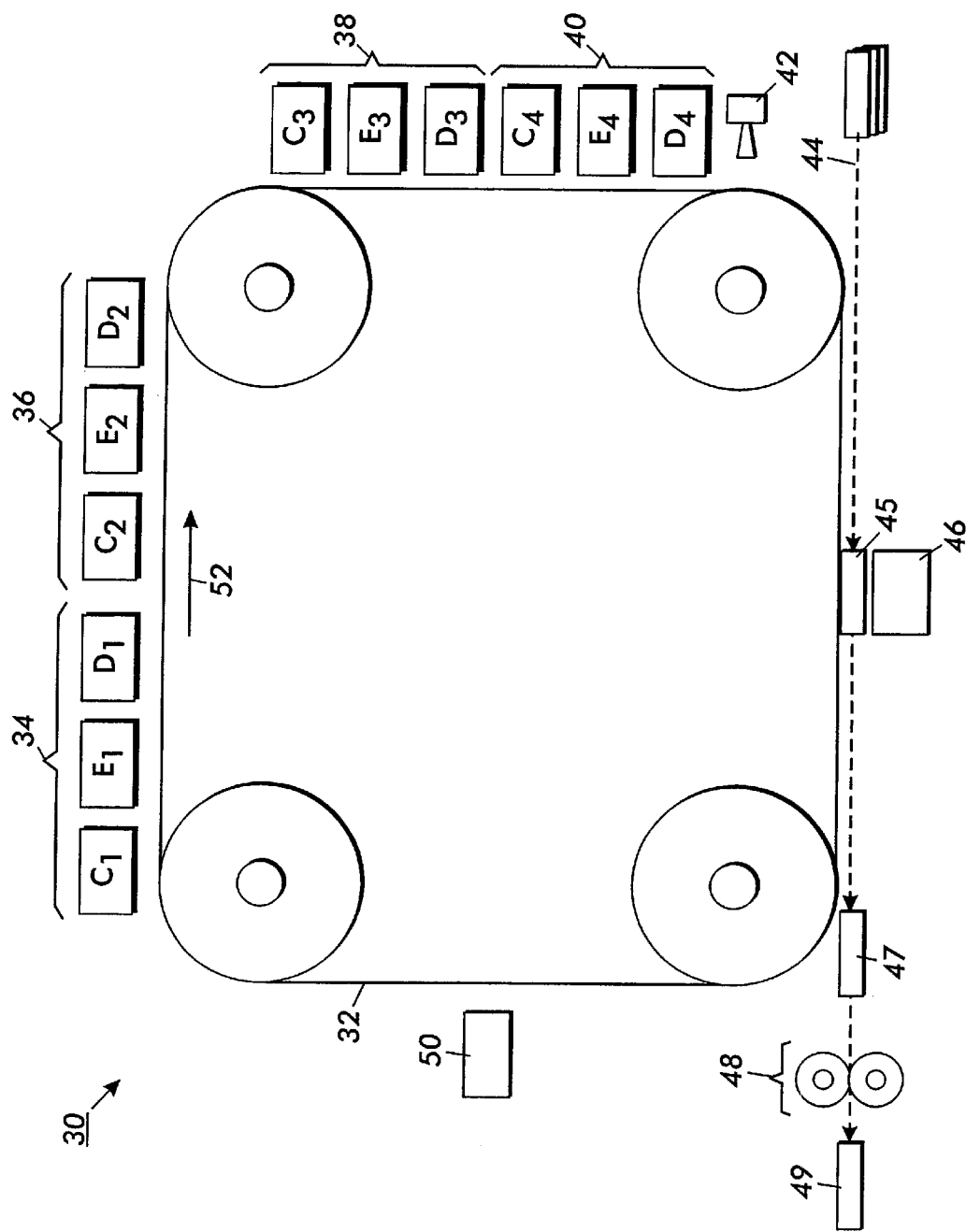
FIG. 2 schematically illustrates a single pass electrophotographic marking engine incorporating features of the present invention.

Referring to FIG. 2, a schematic diagram of a single pass multicolor electrophotographic marking engine ("single pass marking engine") 30 that incorporates features of the present invention is shown. Since the art of electrophotographic marking is well known, FIG. 2 and the discussion that follows provides a brief overview of the various processing stations of the marking platform and identifies the relationship of the present invention to the embodiment being described and a number of alternate embodiments. The single pass marking engine 30 is comprised of a photoreceptor belt 32, four sets of color separation stations (34, 36, 38, 40), a optical sensor 42, a target substrate path 44, a transfer station 46, a fusing station 48, and a cleaning station 50. Each color separation station (34, 36, 38, 40) is comprised of a charging station ($C_1 \ldots C_4$), an imaging and exposing station ($E_1 \ldots E_4$), and a developing station ($D_1 \ldots D_4$). Accordingly, the single pass marking engine 30 is capable of developing a composite fall color image from four color separations (e.g., cyan, yellow, magenta, and black).

While the present invention is being described in connection with the single pass multicolor electrophotographic marking engine 30, it is not intended to limit the present invention to that embodiment. On the contrary, it is intended for the present invention to apply to all alternatives, modifications, and equivalents as may be included within the spirit and scope of this description and the appended claims. The present invention is indeed applicable to any electrophotographic marking engine, including marking engines that use a multiple pass architecture that either accumulate the composite multicolor image on the photoreceptor or on a target substrate and marking engines that employ an alternate single pass architecture, known as a tandem architecture, and those with an intermediate transfer belt. The present invention is also applicable to ink marking engines, including ink-jet marking engines, printing presses, and printing technologies such as lithography. With regard to marking platforms incorporating an applicable marking engine architecture, the present invention is applicable to copiers, printers, multifunction peripherals, and other devices using full color marking engines, high fidelity color marking engines, and highlight color marking engines that implement either process color separation, spot color separation, or a combination of process color separation and spot color separation.

Figure 3:
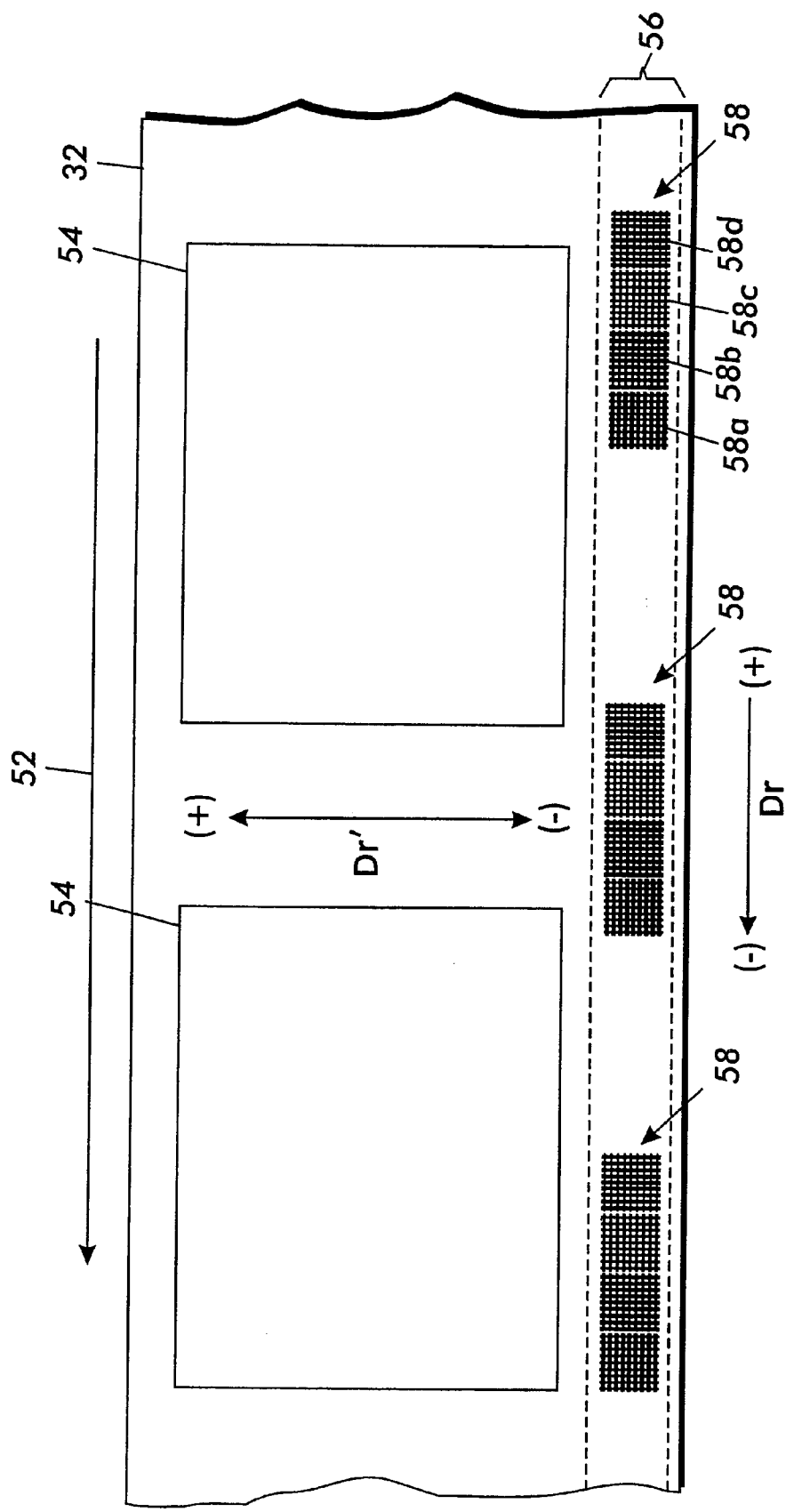
FIG. 3 shows a top view of a section of a photoreceptor belt from the single pass electrophotographic marking engine of FIG. 2. Two print page image areas and a test pattern image area are shown on the surface of the photoreceptor belt as one embodiment of the present invention. Note that other embodiments are contemplated.
Figure 4:
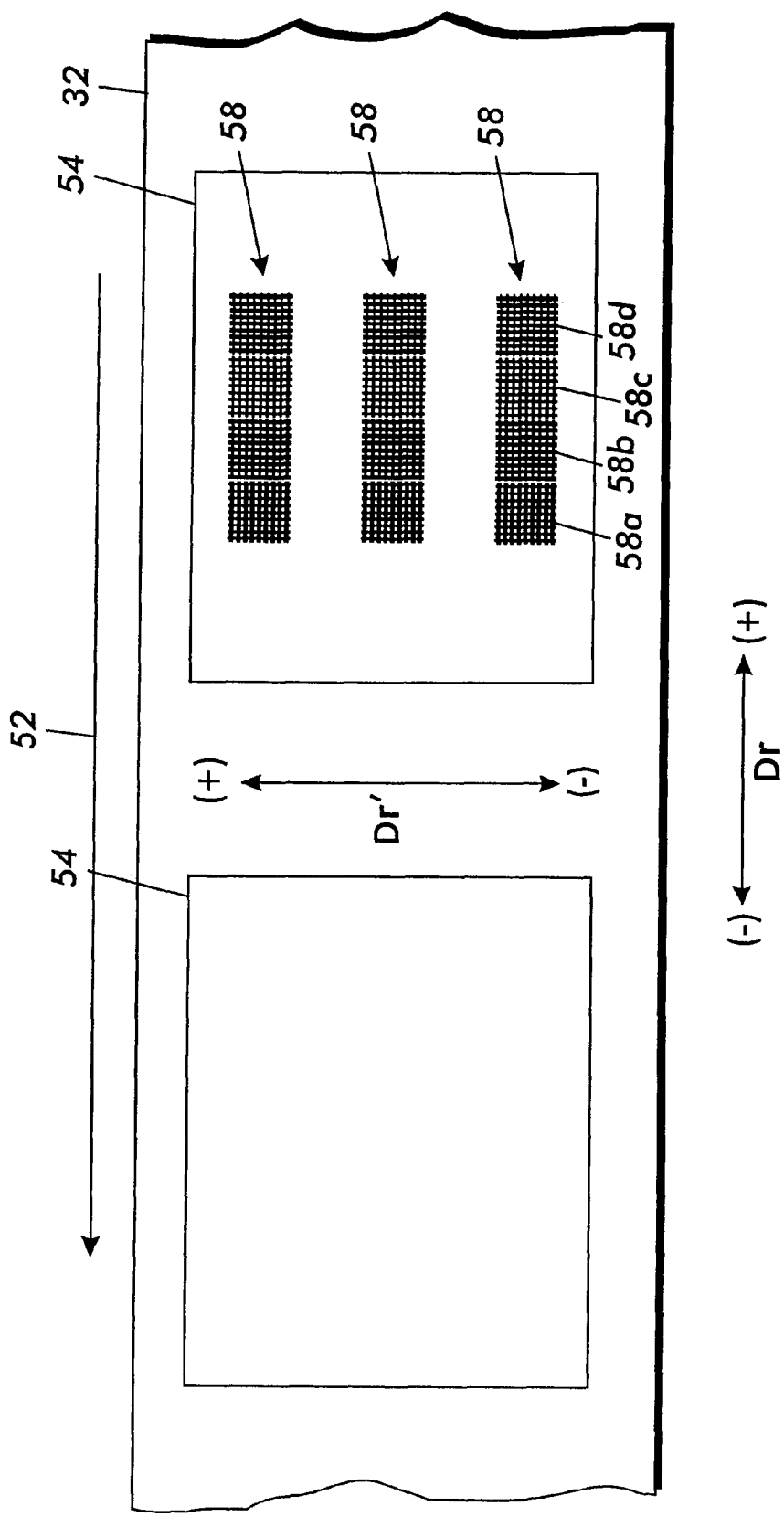
FIG. 4 shows a top view of a section of an alternate photoreceptor belt from the single pass electrophotographic marking engine of FIG. 2. An alternate embodiment of the present invention shows two print page image areas on the surface of the photoreceptor belt with one print page image area being shown when it is being employed to image test patterns.

Referring to FIG. 3, a section of the photoreceptor belt 32 of the single pass marking engine 30 is shown. Note that the process direction arrow 52 indicates the direction of movement of the photoreceptor belt 32. The surface of the photoreceptor belt 32 includes at least a portion of one print page image area 54 for developing toner images to be transferred to a target substrate 45. The surface of the photoreceptor belt 32 also includes an area along the periphery of the print page image area(s) 54 for imaging test patterns 58, referred to as a test pattern image area 56. The print page image area 54 and test pattern image area 56 are charge-retentive, imaging regions. In an alternate embodiment, as shown in FIG. 4, the test patterns 58 may be imaged in any one of the print page image areas 54, eliminating the need for the separate test pattern image area 56. In another alternate embodiment, the test patterns 58 may be imaged in the inter-document area of the photoreceptor belt 32 between the print page image areas 54. In still another alternate embodiment, a rotating drum (not shown) may be used in place of the photoreceptor belt 32. Referring again to FIG. 2, the electrophotographic process begins at a charging station $C_1$ of a first color separation station 34. The following discussion basically tracks one photoconductive imaging region (either a print page image area 54 or a test pattern image area 56) through one cycle of the electrophotographic process. The imaging region is advanced by the photoreceptor belt 32 in a clockwise direction as indicated by the process direction arrow 52 through the various stations comprising the complete process. The imaging region passes through the charging station $C_1$ where a corona generating device charges the region to a relatively high, substantially uniform, preferably negative potential. Next, the charged imaging region is advanced through an imaging and exposing station $E_1$. At the imaging and exposing station $E_1$, the uniformly charged imaging region is exposed by focusing a light source, such as a laser or light emitting diode (LED) array, on the region and discharging specific areas of the surface to create an electrostatic latent image representing the desired output from the first color separation station 34. Next, the imaging region is advanced through a developing station $D_1$. At the developing station $D_1$, a development system advances developer material consisting of carrier granules and charged toner particles into contact with the electrostatic latent image. The toner particles form a first developed toner image layer on the electrostatic latent image in the first color separation.

The electrophotographic process continues as the imaging region advances to a second color separation station 36. At the second color separation station 46, the imaging region passes through a charging station $C_2$ where a corona recharge device is employed to raise the voltage level of both the toned and untoned areas of the imaging region to a substantially uniform level. The recharging device serves to recharge the photoreceptor to a predetermined level. Next, the recharged imaging region is advanced through an imaging and exposing station $E_2$. At the imaging and exposing station $E_2$, the uniformly charged imaging region is selectively discharged to create a latent image representing the desired output from the second color separation station 36. Next, the imaging region is advanced through a developing station $D_2$. At the developing station $D_2$, a development system presents toner particles to the electrostatic latent image. The toner particles form a second developed toner image layer on the imaging region in the second color separation. The second color separation, for example, may be yellow.

The electrophotographic process continues as the imaging region advances through a third color separation station 38 and a fourth color separation station 40. For the third color separation station 38, the imaging region passes through a charging station $C_3$, an imaging and exposing station $E_3$, and a developing station $D_3$ in the same manner as for the second color separation station 36. The toner particles from the developing station $D_3$ form a third developed toner image layer on the imaging region in the third color separation. The third color separation, for example, may be magenta. For the fourth color separation station 40, the imaging region passes through a charging station $C_4$, an imaging and exposing station $E_4$, and a developing station $D_4$, also in the same manner as for the second color separation station 36. The toner particles from the developing station $D_4$ form a fourth developed toner image layer on the imaging region in the fourth color separation. The fourth color separation, for example, may be cyan.

At this point, for the embodiment being described, a full color composite toner image is developed on the imaging region of the photoreceptor belt 32. Next, as shown, the photoreceptor belt 32 advances past an optical sensor 42. In the embodiment being described, the optical sensor 42 is positioned over the photoreceptor belt 32 above the area designated for the test pattern image area 56 and oriented toward the photoreceptor belt 32. Assuming the developed imaging region described above was a test pattern image area 56 and the developed image was a color registration test pattern 58, as the photoreceptor belt 32 passes the optical sensor 42 the test pattern image area 56 passes under the optical sensor 42. In an alternate embodiment, the color registration test pattern 58 is imaged in the print page image area 54 and the optical sensor 42 is positioned over the print page image area 54. While this alternate embodiment can save space with respect to the size of the photoreceptor belt 32, it does not permit simultaneous imaging of a print page and the color registration test pattern.

Continuing with the embodiment depicted in FIG. 2 and assuming the developed imaging region described above was a print page image area 54, the print page image area 54 containing the full color composite toner image advances to the transfer station 46. As the print page image area 54 advances to the transfer station 46, a target substrate 45 is simultaneously fed along a target substrate path 44 to the transfer station 46. At the transfer station 46, the back of the target substrate 45 is charged such that when the target substrate 45 is moved into contact with the print page image area 54 on the photoreceptor belt 32 the toner particles are attracted from the print page image area 54 and transferred to the target substrate 45 forming a transferred target substrate 47. The transferred target substrate 47 continues along the target substrate path 44 to a fusing station 48. At the fusing station 48, the transferred target substrate 47 passes between a heated fuser roller and a pressure roller and the toner particles are permanently affixed to the transferred target substrate 47, forming the fused target substrate 49. After the fusing station 48, a chute (not shown) guides the fused target substrate 49 to a catch tray (not shown) where it is accessible to an equipment operator. After the transfer operation, the photoreceptor belt 32 advances from the transfer station 46 to a cleaning station 50. At the cleaning station 50, residual toner particles are removed from the photoreceptor belt 32 to prepare it for another electrophotographic cycle.

In an alternate embodiment, the optical sensor 42 may be located between the transfer station 46 and the fusing station 48 and oriented to detect the color registration test pattern 58 on the transferred target substrate 47 as it proceeds along the target substrate path 44. Obviously, this alternate embodiment requires the color registration test pattern 58 to be imaged in the print page image area 54 and transferred to the target substrate 45. In another alternate embodiment, the optical sensor 42 may be located between the fusing station 48 and the catch tray (not shown) and oriented to detect the color registration test pattern 58 on the fused target substrate 49 as it proceeds along the target substrate path 44. In this alternate embodiment, the optical sensor 42 may be located outside the single pass marking engine 30, possibly in a finisher assembly (not shown) of the marking platform 10.

In still another alternate embodiment, the optical sensor 42 may be located outside the marking platform 10 as a peripheral device. In this alternate embodiment, the optical sensor 42 is connected to the marking platform 10 via an interface cable and an operator must place the fused target substrate 49 under the optical sensor 42 so that the color registration test pattern 58 can be detected.

Figure 9:
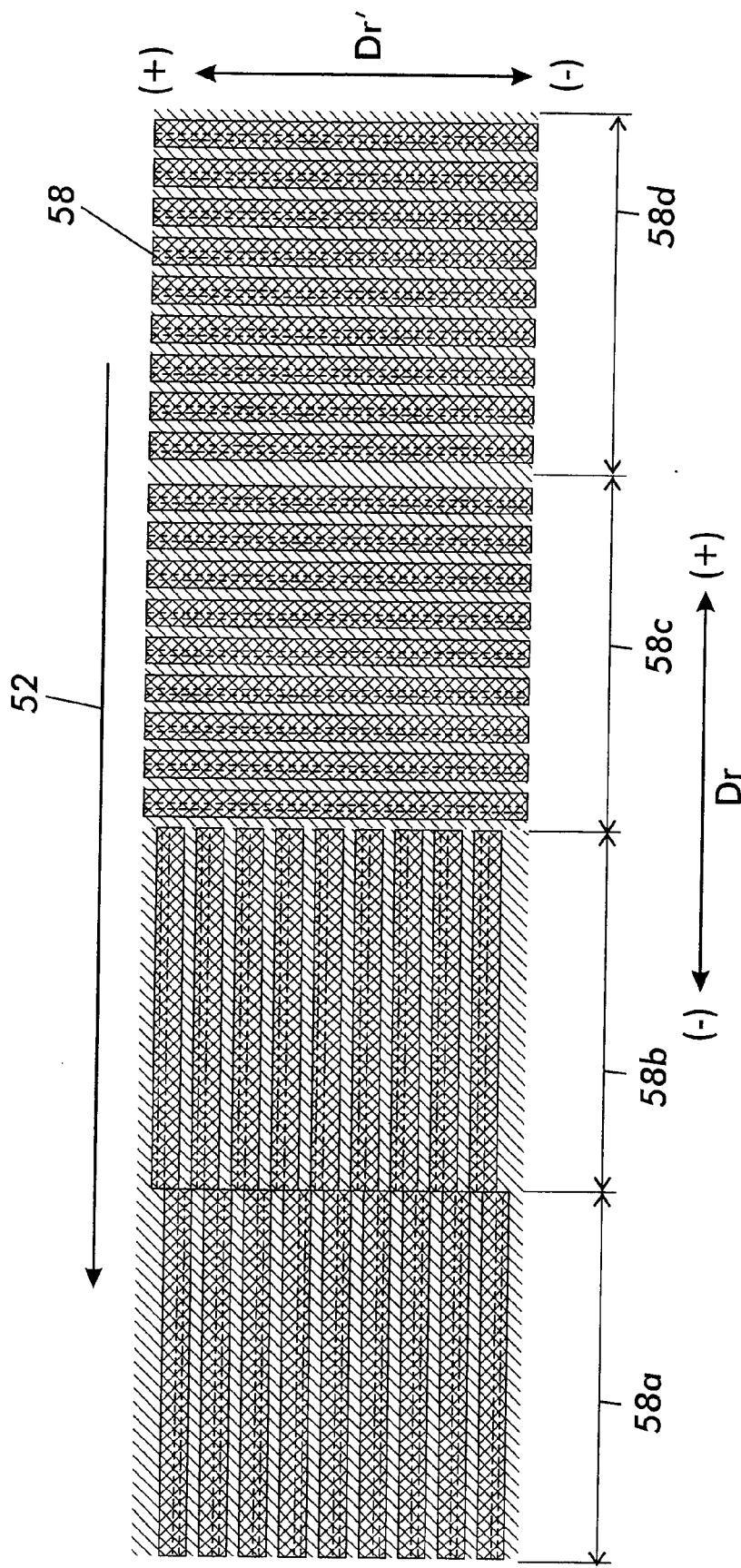
FIG. 9 shows an enlarged view of the color registration test pattern for one non-black color separation. This includes two sets of color registration patterns. 58a and 58b enable measurement of cross process registration and 58c and 58d enable measurement of process direction registration.

Referring to FIGS. 3, 4, and 9, the color registration test pattern 58 of the present invention is comprised of four regions (58a, 58b, 58c, 58d). Accordingly, the present invention measures color registration in four degrees of freedom. The four degrees of freedom are referred to as negative (−) and positive (+) in the process direction (Dr) and negative (−) and positive (+) in the cross-process direction (Dr'). As shown, the four regions include a negative (−) cross-process region 58a, a positive (+) cross-process region 58b, a negative (−) process region 58c, and a positive (+) process region 58d. Each of the four regions (58a, 58b, 58c, 58d) is comprised of a first pattern and a second pattern that are positioned on top of each other. The first pattern is created using a black marking material. The second pattern is created using a non-black color marking material. For purposes of the present invention, the first pattern may be on top of the second pattern, or vice versa. One multicolor marking platform. For the embodiment being described, as shown in FIGS. 3 and 4, three color registration test patterns 58 are employed in order to measure the color registration of each of the three non-black colors (e.g., yellow, magenta, and cyan).

The black pattern and non-black color pattern are designed and positioned such that their alignment is affected by registration errors between the black and non-black color separations. Under perfect registration conditions, the black pattern and non-black color pattern completely cover the background surface with marking material. Accordingly, if color registration error exists a space with no marking material remains within one or more of the regions (58a, 58b, 58c, 58d) of the color registration test pattern 58. The background surface is visible for any unmarked space within the color registration test pattern 58. In accordance with the present invention, where the background surface is highly reflective and the marking materials used to create the black pattern and non-black color pattern are significantly less reflective, an optical sensor 42 can detect registration errors by illuminating the test pattern region (58a, 58b, 58c, or 58d) with a light source and measuring either the reflectance or density of the test pattern region (58a, 58b, 58c, or 58d). Further, if a registration error is detected the reflectance or density measurement is processed to compute an estimate of the registration error.

Figure 5A:
FIGS. 5a and 5b show a pattern of black bars and a pattern of non-black color bars, respectively. Each figure exhibits features of the present invention.

For clarity, the following description refers primarily to both cross-process regions (58a, 58b) of the color registration test pattern 58. The black pattern 60 in the two cross-process regions (58a, 58b) is shown in FIG. 5a. The black pattern 60 is comprised of a plurality of black bars 62 and a plurality of spaces 64. The black pattern 60 begins with a black bar 62 and alternates between spaces 64 and black bars 62, finally ending with a black bar 62. Note that the black bars 62 are illustrated using a first fill pattern. In practice, the black bars are substantially solid. As shown, each black bar 62 and each space 64 in the black pattern 60 are equal in width. While the equal dimension is preferred, alternate dimensions where the block bar 62 is narrower or wider than the space 64 are possible.

A preferred method of evaluating the reflectance or density of the patterns would be to use a large area or macro optical sensor, that is a sensor that measures the reflectance or density over some relatively large portion of the test pattern. The area measured by the sensor is sometimes referred to as the aperture of the measurement. An alternative method of evaluating the reflectance or density of the patterns would be to use a small area or micro optical sensor. The use of the micro measurement is convenient for illustrating the mechanism being described within this patent but in practice the macro measurement offers the benefit of eliminating a number of tedious measurements and related calculations. As described below, the intent of the tedious measurements and related calculations are to average the reflectance or density measurements over some portion of the test pattern. The use of the macro measurement inherently provides the average measurement over some portion of the test pattern.

To exploit the benefits of using a macro measurement the specific width of each black bar 62 and each space 64, as shown in FIG. 5*a*, and the corresponding size of the color registration test pattern 58, must be based on several factors. First, the width of the black bar 62 must be much less than the field of view of the optical sensor 42 in order for measurements to be sufficiently insensitive to the exact position of the instrument. Second, the width of the space 64 must be greater than two times the maximum registration error expected to be experienced between the black and non-black color separations. Any width between these two constraints is acceptable, although a sufficient safety margin is preferred. In the trade, a limit of 125 micrometers is considered a maximum acceptable misregistration errors for quality pictorial color images and some imaginary techniques require registration accuracy of 15 micrometers. These examples would lead to a minimum width of 30 to 250 micrometers for the black bar 62. Accordingly, one black bar 62 and one space 64 would have a combined minimum width of 60 to 500 micrometers. It is preferred that the field of view of the optical sensor 42 be able to sample at least 30 black bars 62 and spaces 64. Therefore, the minimum width of a particular region of the color registration test pattern 58 could range from 500 to 15,000 micrometers (0.5 to 15 mm), depending on the specific registration accuracy required for the marketing platform.

Figure 5B:
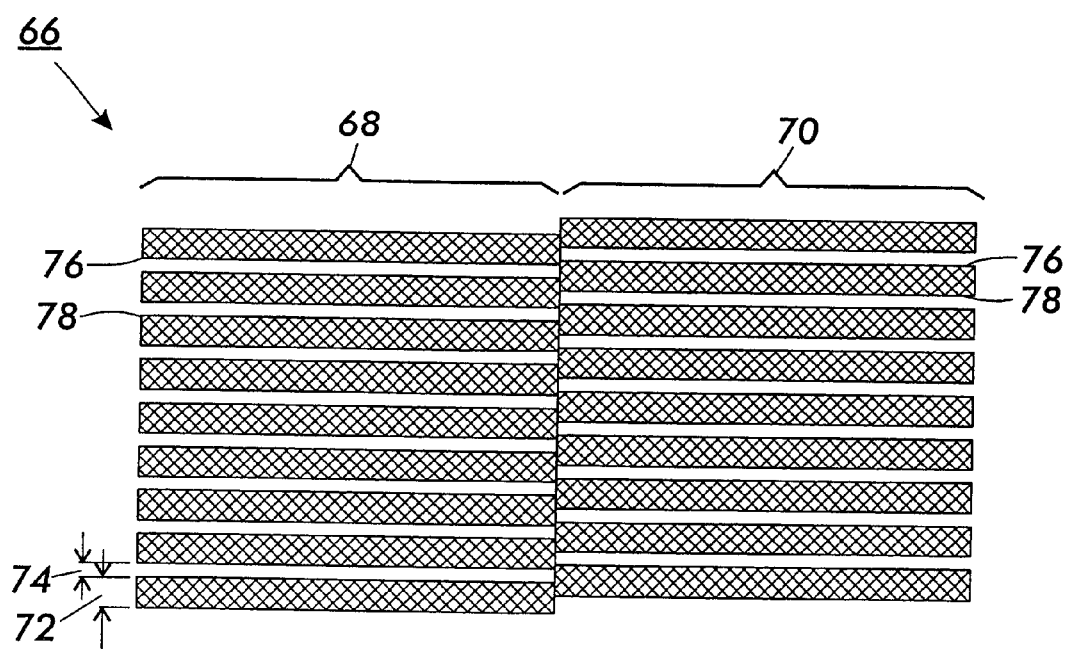

The non-black color pattern 66 in the two cross-process regions (58*a*, 58*b*) is shown in FIG. 5*b*. Note that there are two distinguishable sections in FIG. 5*b*, a left section 68 and a right section 70. The left section 68 corresponds to the negative (−) cross-process region 58*a*. The right section 70 corresponds to the positive (+) cross-process region 58*b*. Both sections (68, 70) are identical, except that the right section 70 is shifted a predetermined distance to the right of the left section 68. Each section (68, 70) is comprised of a plurality of non-black color bars 72 and a plurality of spaces 74. The pattern in each section (68, 70) begins with a non-black color bar 72 and alternates between spaces 74 and non-black color bars 72, finally ending with a non-black color bar 72. Note that the non-black color bars 72 are illustrated using a second fill pattern which is different from the first fill pattern used to illustrate the black bars 62. In practice, the non-black color bars 72 are substantially solid. The combined width of any one non-black color bar 72 and any one space 74 in the non-black color pattern 66 must be substantially equivalent to the combined width of any one black color bar 62 and any one space in the black pattern 60. More specifically, the width of each non-black color bar 72 is optimally 1.5 times the width of the black color bar 62 and the width of the space 74 is optimally 0.5 times the width of the black color bar 62. While the optimized dimensions are preferred, alternate dimensions where the non-black color bar 72 and the space 74 are in different proportions to each other are possible.

Note that in FIG. 5*b* the right section 70 of the non-black color pattern 66 is shifted up relative to the left section 68 by a distance equal to the width of the space 74. Accordingly, the relationship between the left section 68 and the right section 70 is such that a very thin horizontal line may pass through both sections of the non-black color pattern 66 such that it will continuously intercept a non-black color bar 72 in either the left section 68, the right section 70, or both left and right sections (68, 70). In other words, the horizontal line will never be able to avoid intercepting at least one non-black color bar 72. Furthermore, the offset between the sections (68, 70) of the non-black color pattern 66 creates multiple points where an edge of one non-black color bar 72 in the left section 68 and an edge of one non-black color bar 72 in the right section 70 are along the same right line. The edge of the non-black color bars 72 coincident with such horizontal lines is referred to as a non-registered edge 76. An opposite edge of the non-black color bars 72, those not coincident with such horizontal lines, is referred to as a registered edge 78.

Figure 6:
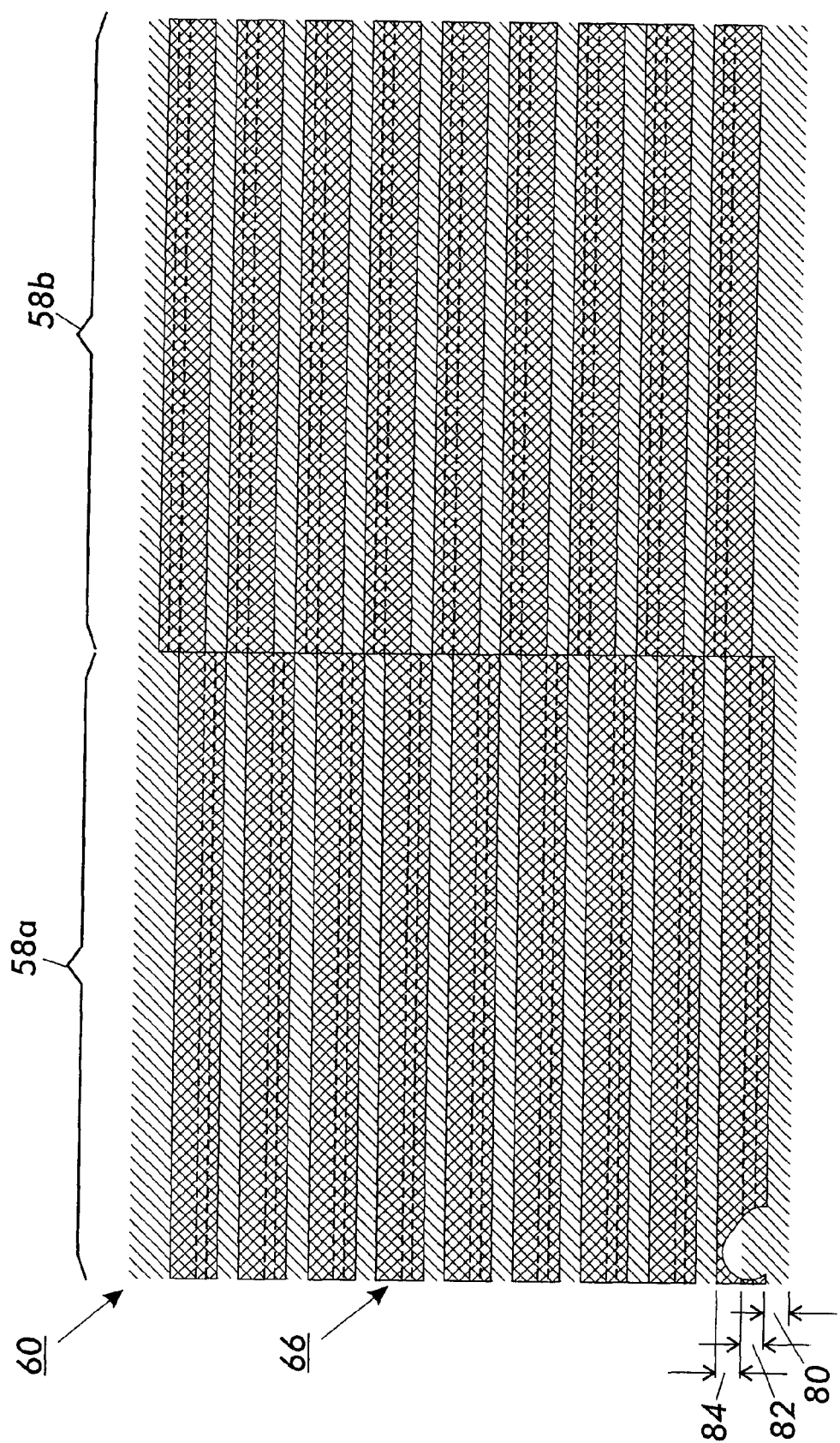
FIG. 6 shows a cross-process color registration test pattern comprising the black bars and non-black color bars of FIGS. 5a and 5b.

Referring to FIG. 6, the black pattern 60 of FIG. 5*a* and the non-black color pattern 66 of FIG. 5*b* are positioned on top of each other to form the two regions (58*a*, 58*b*) of the color registration test pattern 58 intended to measure cross-process registration errors. For purposes of the present invention, the black pattern 60 may be on top of the non-black color pattern 66, or vice versa. The key to the combined pattern is to physically position the two patterns so that each registered edge 78 of the non-black color pattern 66 precisely mates with an edge of an opposing black bar 62 in the black pattern 60. This defines the perfect registration condition where the combination of the black pattern 60 and the non-black color pattern 66 completely cover the background surface with marking material. Furthermore, this defines the point at which the slightest separation between the registered edge 78 of the non-black color pattern 66 and the edge of the opposing black bar 62 will reveal the background surface. Such precise positioning of the black pattern and non-black color pattern is accomplished in page description language (PDL) or bitmap data used to define the patterns within the controller 16 and conveyed to the marking engine (22 or 30) via machine readable image data 18. FIG. 6 shows the black pattern 60 and the non-black color pattern 66 combined in perfect registration.

Figure 7A:
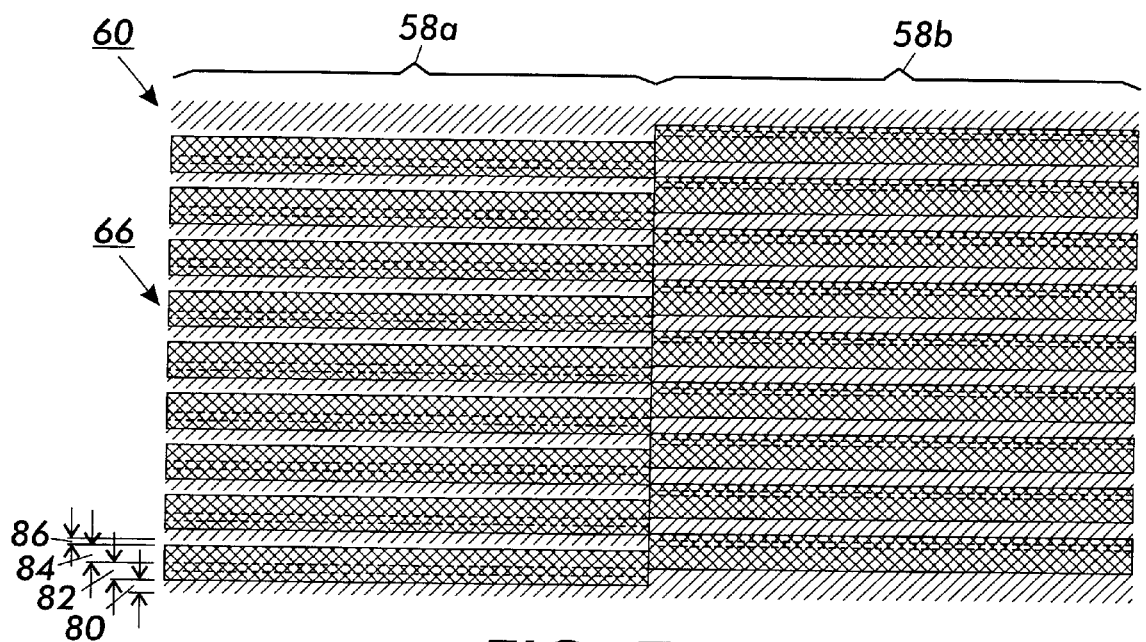
FIG. 7a shows the test pattern of FIG. 6 with a negative cross-process registration error in the non-black color.

To understand operation of the test pattern further, FIG. 7*a* shows the cross-process regions (58*a*, 58*b*) of the color registration test pattern 58 displayed with a negative (−) cross-process registration error. This may be the case if the pattern was printed by a process demonstrating a negative (−) cross registration error. As shown, with a negative (−) cross-process registration error, the non-black color pattern 66 is shifted down with respect to the black pattern 60 and the perfect registration condition of FIG. 6. It is apparent that the slightest shift downward will cause a line to open up, revealing the background surface, in the negative (−) cross-process region 58*a* of the color registration test pattern 58.

Figure 7B:
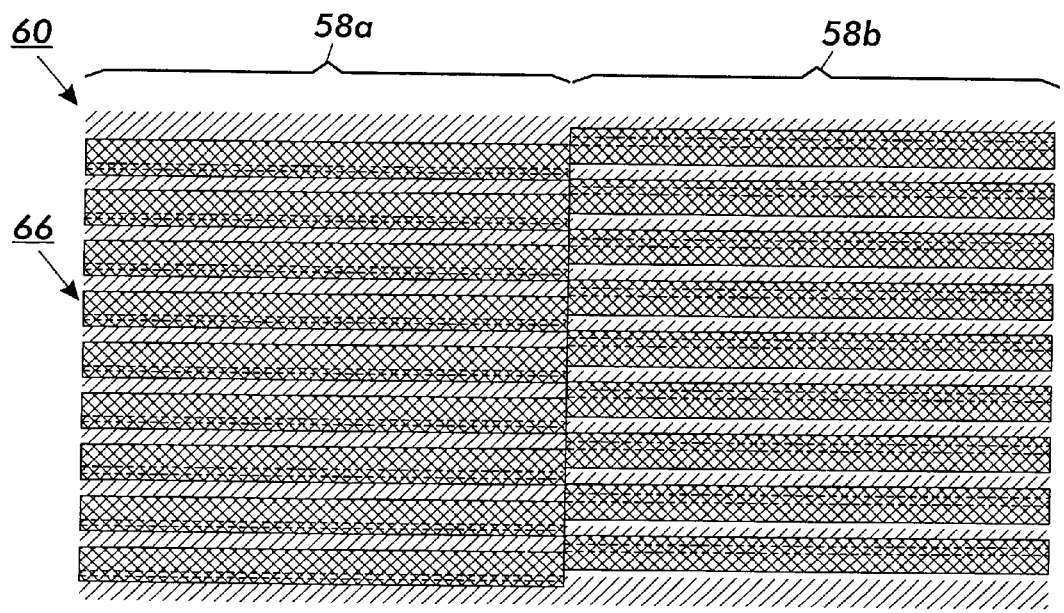
FIG. 7b shows the test pattern of FIG. 6 with a positive cross-process registration error in the non-black color. Both figures exhibit features of the present invention.

FIG. 7*b* shows the cross-process regions (58*a*, 58*b*) of the color registration test pattern 58 displayed with a positive (+) cross-process registration error. This may be the case if the pattern was printed by a process demonstrating a positive (+) cross registration error. As shown, with a positive (+) cross-process registration error, the non-black color pattern 66 is shifted upward with respect to the black pattern 60 and the perfect registration condition of FIG. 6. It is apparent that the slightest shift upward will cause a line to open up, revealing the background surface, in the positive (+) cross-process region 58*b* of the color registration test pattern 58.

Note that the discussion of FIGS. 3, 4, 5*a*, 5*b*, 6, and 9 has been in reference to the color registration test pattern 58 on the photoreceptor belt 32 from a top view of the photoreceptor belt 32 in accordance with one embodiment of the present invention. A number of alternate embodiments have been discussed where the color registration test pattern 58 is detected on the target substrate 45 or on an intermediate substrate rather than on the photoreceptor belt 32. It should be understood that the color registration test pattern 58 is reversed in the cross-process direction Dr' when viewed on the target substrate 45 or on an intermediate substrate and that references to left and right regarding the cross-process registration would be reversed in such alternate embodiments. Similarly, references to negative (−) and positive (+) regions (58*a*, 58*b*, 58*c*, 58*d*) in the color registration test pattern 58 are relative to a given point of reference and, in practice, may be reversed in any embodiment. Also, any combination is permitted regarding the sequence or positioning of the regions (58*a*, 58*b*, 58*c*, 58*d*) comprising the color registration test pattern 58 in any embodiment.

The optical sensor 42 measures the reflectance or density of each region (58*a*, 58*b*, 58*c*, 58*d*) of the color registration test pattern 58. These four measurements provide an indication of the current color registration of the non-black color being measured with respect to negative (−) cross-process, positive (+) cross-process, negative (−) process, and positive (+) process directions. For each measurement, the optical sensor 42 illuminates the region (e.g., 58*a*) with a light source and detects the average reflectance ($R_{avg}$) or average density ($D_{r\ avg}$) of a representative subsection of the entire region (e.g., 58*a*). The reflectance of a specimen surface is typically represented by the ratio of light energy reflected by the specimen surface ($R_s$) to the amount of light energy that would be reflected by a perfectly reflective surface ($R_t$). Note that $R_t$ may also be characterized as the incident light energy illuminating the specimen surface. This ratio is known as the reflectance factor (R) and is shown in the following equation:

$$R = \frac{R_s}{R_t}. \tag{1}$$

Further, a certain reflectance factor (R) corresponds to a certain density ($D_r$) according to a logarithmic relationship. Density ($D_r$) is negative the base 10 logarithm of the reflectance factor (R) as shown in the following equation:

$$D_r = -\log_{10} R = -\log_{10} \frac{R_s}{R_t}. \tag{2}$$

In the context of the present invention, the region (e.g., 58*a*) of the color registration test pattern 58 is the specimen surface ($R_s$). Measurement of the reflectance ($R_s$) or density ($D_r$) of the region (e.g., 58*a*) is a relative measurement in reference to the background surface ($R_b$). Under such conditions, the reflectance of the background surface ($R_b$) can be substituted for ($R_t$) in equation (2) as follows:

$$D_r = -\log_{10} \frac{R_s}{R_b}. \tag{3}$$

Equation (3) can also be written as:

$$D_r = \log_{10} R_b - \log_{10} R_s \tag{4}.$$

In order to reliably detect registration errors, the reflectance of the background surface ($R_b$) must be high and the reflectance of the black and non-black color marking materials used to create the color registration test pattern 58 must be significantly less reflective. For example, if the background surface is white it is highly reflective to all light in the visible spectrum. Black marking material, as used to create the black pattern 60, has significantly less reflectance than white for all light in the visible spectrum. Hence, the color of illumination for measurement of the black portions of the test pattern is not critical since the black colorant absorbs all colors by the definition of black. However, in order for the non-black color marking material used to create the non-black color pattern 66 to be significantly less reflective than white, the color of the illuminating light or the color of light detected must be the complement of the non-black color (i.e., blue light for yellow, green light for magenta, red light for cyan). Therefore, the optical sensor 42 must either illuminate the region (e.g., 58) of the color registration test pattern 58 with complementary colored light rays or use a complementary color filter or lens in conjunction with the detector. As discussed, the large area optical sensor 42 measures either the average reflectance ($R_{avg}$) or the average density ($D_{r\ avg}$) of each region (58*a*, 58*b*, 58*c*, 58*d*) of the color registration test pattern 58. The optical sensor 42 provides its measurements, as feedback signals 24, to the controller 16. For reflectance measurements, the controller 16 may convert the average reflectance ($R_{avg}$) to an average density ($D_{r\ avg}$) using equation (3). Such a conversion is based on an assumption that the background reflectance ($R_b$) is normalized to a reflectance value of 1.0. This means that an actual measurement of the reflectance of a clean background surface without any marking material by the optical sensor 42 would be considered the reference for further measurements on the surface. This reduces equation (4) to a simpler form:

$$D_r = -\log_{10} R'_s \tag{5}$$

Where $R'_s$ is the reflectance of the specimen given that the optical sensor is calibrated to measure the reflectance of the clean background surface as 1.0.

Next, the controller 16 based on the average reflectance ($R_{avg}$) or average density ($D_{r\ avg}$) from the measurements of each region to the measurement from its complimentary region or to stored known values for perfect registration to determine if there is a registration error. If a registration error is identified, the controller 16 uses the measurements to estimate the registration error. Finally, the controller 16 acts to correct the misregistration condition.

Figure 8A:
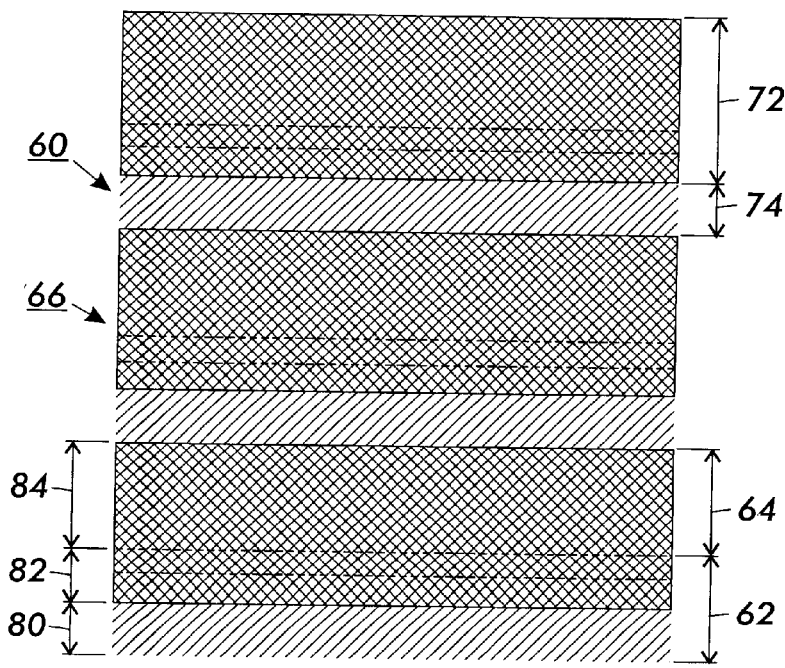
FIG. 8a is an enlarged view of a section of the test pattern of FIG. 6 with perfect color registration.

In order to understand the average reflectance ($R_{avg}$) and average density ($D_{r\ avg}$) measurements of the present invention, one must understand how the combined black pattern and non-black color pattern create a composite pattern with three areas of different reflectance and, accordingly, different density under perfect registration conditions. In perfect registration, as shown in FIG. 6, the composite pattern is comprised of a repetitive sequence of a black area 80, a mixed black/non-black color area 82, and a non-black color area 84. FIG. 8*a* shows an enlarged view of a section of the negative (−) cross process region 58*a* of FIG. 6 with sequences of the black area 80, the mixed black/non-black color area 82, and the non-black color area 84. The average reflectance ($R_{avg}$) of the region (e.g., 58*a*) can be calculated by measuring the reflectance or density of each area (80, 82, 84) microscopically and then performing the averaging process manually. The average density ($D_{r\ avg}$) of the region (e.g., 58*a*) can be calculated from the average reflectance ($R_{avg}$). Alternatively, the average reflectance ($R_{avg}$) of the region (e.g., 58*a*) can be calculated from the average density of each area. For example, referring to FIG. 8*a* and presuming that the non-black color is magenta, the three areas with different reflectance/density are the black area 80, the mixed black/magenta area 82, and the magenta area 84. Assuming a micro optical sensor with a green light source is used to measure the reflectance and density of each area (80, 82, 84) and the reflectance and density of the background surface, the average reflectance ($R_{avg}$) and average density ($D_{r\ avg}$) calculations for the region (e.g., 58*a*) are based on the criteria in the following table.

| Area | Measured Density | Coverage |
| --- | --- | --- |
| Background ($R_b$) | 0.000 | 0.00 (0%) |
| Black (80) | 1.347 | 0.25 (25%) |
| Magenta & Black (82) | 2.803 | 0.25 (25%) |
| Magenta (84) | 1.456 | 0.50 (50%) |

The average reflectance ($R_{avg}$) is calculated by summing the weighted micro reflectance of each area (80, 82, 84). The average density ($D_{r\ avg}$) is calculated from the average reflectance ($R_{avg}$) using equation (3). If necessary, the reflectance of each area (80, 82, 84) can be calculated from the density of each area (80, 82, 84) according to the following equation derived from equation (3):

$$R_s = \frac{10^{-D_r}}{10^{-D_b}}. \tag{6}$$

As stated above, if the density measurement has been calibrated to yield a value of zero when measuring the substrate or background, equation (6) reduces to:

$$R_s = 10^{-D_r} \tag{7}$$

The table below shows the values calculated for the reflectance for each area (80, 82, 84), the weighted reflectance for each area (80, 82, 84), the average reflectance ($R_{avg}$) of the region (e.g., 58*a*), and the average density ($D_{r\ avg}$) of the region (e.g., 58*a*) from the criteria identified above. The reflectance is calculated from the measured micro density using equation (6). The weighted reflectance is calculated by multiplying the calculated reflectance by the coverage for the area (80, 82, 84) with respect to the region (e.g., 58*a*). The average reflectance ($R_{avg}$) is calculated by summing the weighted reflectance of each area (80, 82, 84). The average density ($D_{r\ avg}$) is calculated using equation (3).

| Area | Measured Density | Calculated $R_s$ | Coverage | Weighted $R_s$ |
| --- | --- | --- | --- | --- |
| Background ($R_b$) | 0.000 | 1.000 | 0.00 (0%) | 0.00000 |
| Black (80) | 1.347 | 0.045 | 0.25 (25%) | 0.0112 |
| Magenta & Black (82) | 2.803 | 0.0016 | 0.25 (25%) | 0.00039 |
| Magenta (84) | 1.456 | 0.035 | 0.50 (50%) | 0.0175 |
| | | | Average Reflectance ($R_{avg}$) | 0.0291 |
| | | | Average Density ($D_{r\ avg}$) | 1.536 |

Figure 8B:
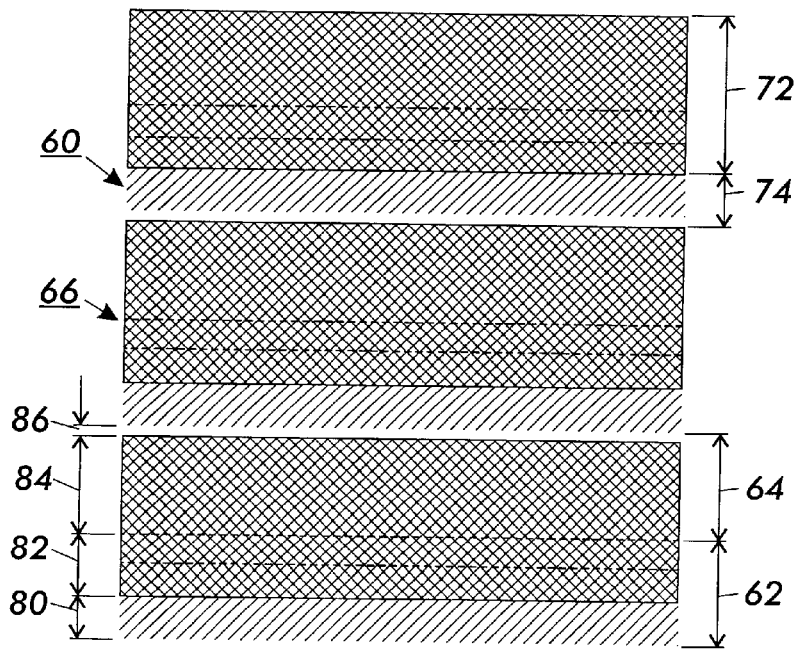
FIG. 8b is an enlarged view of a section of the test pattern of FIG. 6 with a negative color registration error.

In order to understand how the processor 16 estimates color registration errors in accordance with the present invention, one must understand how the combined black pattern and non-black color pattern create a composite pattern with four areas of different reflectance and, accordingly, different density when a color registration error is present. For example, in a negative (−) cross-process registration error, as shown in FIG. 7*a*, the composite pattern in the negative (−) cross-process region 58*a* is comprised of a repetitive sequence of a black area 80, a mixed black/non-black color area 82, a non-black color area 84, and an unmarked area 86 revealing the background surface. FIG. 8*b* shows an enlarged view of a section of the negative (−) cross process region 58*a* of FIG. 7*a* with sequences of the black area 80, the mixed black/non-black color area 82, the non-black color area 84, and the unmarked area 86. Note that the unmarked area 86 is zero and therefore not shown in FIG. 8*a*. As described for perfect registration, the average reflectance ($R_{avg}$) and average density ($D_{r\ avg}$) of the region (e.g., 58*a*) with areas (80, 82, 84, 86) of different reflectance/density can be calculated by determining the weighted reflectance of each of the areas (80, 82, 84, 86). Further, the average density of the region (e.g., 58*a*) when a color registration error is present ($D_e$) can be used in combination with the measured average density of its complimentary region (e.g., 58*b*) or a stored known value of the average density of the region for perfect registration ($D_r$) to calculate an estimate of the color registration error using the following equation:

$$x \cong \frac{2a(10^{D_e} - 10^{D_r})}{(1 - 10^{D_r})^2}, \tag{8}$$

where "a" is the width of the black bars 62 in the black pattern 60; "De" is the average density with a color registration error; and, Dr is the average density for the complimentary region (e.g., 58*b*) or for perfect registration.

The average reflectance or average density may be measured using a macro optical sensor as discussed above. Alternatively, the measurements may be made using an micro optical sensor and the average calculated from individual measurements or each area within the region. The following example assumes the measurements are made with an optical sensor that has a micro field of view. In order to calculate the average reflectance ($R_{avg}$) of the region (e.g., 58*a*) when a color registration error is present, one must understand the coverage of each area (80, 82, 84, 86) with respect to the total area of a specimen surface being considered. Based on the design of the color registration test pattern, the minimum specimen surface that represents the average reflectance ($R_{avg}$) of the region (e.g., 58*a*) is the combined width of one black bar 62 and one space 64 in the black pattern 60. If the width of the black bar 62 is defined as "a", as in equation (8), the width of the space 64 is also "a" and the combined width is "2a". The coverage of each area (80, 82, 84, 86) with respect to the total area of the minimum specimen surface can be viewed with regard to the width of each area (80, 82, 84, 86). Referring to FIG. 8*a*, in terms of "a", the width of the black area 80 is "a/2", the width of the mixed black/non-black color area 82 is "a/2", and the width of the non-black color area 84 is "a". Referring to FIG. 8*b*, note that the emergence of the unmarked area 86, designated "x," causes the width of the black area 80 and the non-black color area 84 to be less than their respective widths in FIG. 8*a* and causes the width of the mixed black/non-black color area 82 to be greater than its width in FIG. 8*a*. Note that when a color registration error is present "x" is greater than zero. Conversely, under perfect registration "x" is equal to zero. These characteristics can be used to determine the coverage of each area (80, 82, 84, 86) with respect to the region (e.g., 58*a*) when a color registration error is present. For example, presuming that the non-black color is magenta, the coverage of each of the four areas (80, 82, 84, 86) in the region (e.g., 58a) can be determined using the following equations:

$$\text{Background } (b, 86) = \frac{x}{2a}; \tag{9}$$

$$\text{Black } (k, 80) = \frac{\frac{a}{2} - x}{2a}; \tag{10}$$

$$\text{Black/Magenta } (mk, 82) = \frac{\frac{a}{2} + x}{2a}; \tag{11}$$

$$\text{Magenta } (m, 84) = \frac{a - x}{2a}. \tag{12}$$

The weighted reflectance of each area (80, 82, 84, 86) is calculated by multiplying the measured or calculated reflectance within each area ($R_k$ for 80, $R_{mk}$ for 82, $R_k$ for 84, $R_b$ for 86) by the coverage of each area. The average reflectance when a color registration error is present ($R_{avg,\,x>0}$) of the region (e.g., 58a) is calculated by summing the weighted reflectance of each area (80, 82, 84, 86) according to the following equation:

$$R_{avg,x>0} = R_b \frac{x}{2a} + R_k \frac{\frac{a}{2} - x}{2a} + R_{mk} \frac{\frac{a}{2} + x}{2a} + R_m \frac{a - x}{2a}. \tag{13}$$

Setting "x" to zero in equation (13) results in the following equation which represents the average reflectance under perfect registration ($R_{avg,\,x=0}$):

$$R_{avg,x=0} = \frac{R_k + R_{mk} + 2R_m}{4}. \tag{14}$$

Factoring equation (13) to isolate "x" and substituting the reference reflectance ($R_{avg,\,x=0}$) for its equivalent according to equation (14) results in the following equation:

$$R_{avg,x>0} = x \frac{R_w - R_m + R_{mk} - R_k}{2a} + R_{avg,x=0}. \tag{15}$$

Solving for x produces the following equation:

$$x = 2a \frac{R_{avg,x>0} - R_{avg,x=0}}{R_w - R_k + R_{mk} - R_m}. \tag{16}$$

Assuming that the reflectance of the background substrate ($R_w$) is equal to 1 results in the following equation:

$$x = 2a \frac{R_{avg,x>0} - R_{avg,x=0}}{1 - R_k + R_{mk} - R_m}. \tag{17}$$

Since $R_m$ and $R_k$ are both small and since $R_{mk}$ is much smaller and the fact that each, as discussed above, occupies a fraction of the total area, it may be reasonable to substitute $R_m R_k$ for $R_{mk}$. Making such substitutions in equation (18) results in the following equation:

$$x = 2a \frac{R_{avg,x>0} - R_{avg,x=0}}{1 - R_k + R_m R_k - R_m}. \tag{18}$$

Factoring the denominator of equation (13a) results in:

$$x = 2a \frac{R_{avg,x>0} - R_{avg,x=0}}{(1 - R_k)(1 - R_m)}. \tag{19}$$

The present invention is based on both the black and non-black color being detected as significantly less reflective than the background surface. Therefore, for purposes of color registration error estimation the reflectance of the black area ($R_k$) and the reflectance of the non-black color area ($R_m$) may be considered approximately equivalent. Making such a substitution in equation (19) and combining the denominator terms results in the following equation:

$$x = 2a \frac{R_{avg,x>0} - R_{avg,x=0}}{(1 - R_m)^2}. \tag{20}$$

The value of the reflectance of the black area ($R_k$) and the reflectance of the non-black color area ($R_m$) may each be approximated by the measured value of $R_{avg,\,x=0}$. Making such a substitution in equation (20) results in the following equation:

$$x = 2a \frac{R_{avg,x>0} - R_{avg,x=0}}{(1 - R_{avg,x=0})^2}. \tag{21}$$

Substituting ($D_{r\,avg,\,x=0}$) for the ($R_{avg,\,x=0}$) and ($D_{r\,avg,\,x>0}$) for the ($R_{avg,\,x>0}$) in equation (21) according to equation (4) results in the following equation:

$$x = 2a \frac{10^{D_{avg,x>0}} - 10^{D_{avg,x=0}}}{(1 - 10^{D_{avg,x=0}})^2}. \tag{22}$$

Note that equation (22) is the same as equation (8) which was previously identified as the equation used by the controller 16 to estimate color registration errors. Again, it was assumed that an optical sensor 42 that makes macro or relatively large area measurements that are averaged over its field of view was best suited to the present invention. If the optical sensor 42 presents density data, the use of equation (22) is appropriate. Alternatively, if the optical sensor 42 presents reflective data, equation (21) should be used. Note that equation (21) and equation (22) estimate registration error based on assumptions that the reflectance (equation (21)) and density (equation (22)) for the black area 80, the mixed black/non-black color area 82, and the non-black color area 84 are approximately equal. In actuality these area are not precisely equal. Nevertheless, the estimation error introduced by approximations in the derivation of equation (21) and equation (22) approaches zero as the actual registration error approaches zero. This is an inherent characteristic of the test pattern 58 because as the actual registration error approaches zero, the reflectance/density measurements of the complementary regions (e.g, 58a, 58b) approach each other and the value for perfect registration. Hence, the equation (21) and equation (22) are well suited to determining the lack of registration error, while also providing a simplified and adequate means of estimating registration error when it exists.

Referring to FIG. 9, an enlarged view of the color registration test pattern 58 of FIGS. 3 and 4 is shown. This view depicts the four regions (58a, 58b, 58c, 58d) in the color registration test pattern 58 as they would be developed for one color separation on the photoreceptor belt according to one embodiment of the present invention. While interpretation of color registration of a given color separation has been described primarily in reference to the cross-process regions 58a and 58b, note that the other two regions 58c and 58d are identical to region 58a and 58b but rotated in different orientations in order to indicate color registration errors in the process direction. The positive (+) cross-process region 58b is oriented about 180 degrees right with respect to the orientation of region 58a. The negative (−) process region 58c is oriented about 90 degrees right with respect to the orientation of region 58a. The positive (+) process region 58d is oriented about 270 degrees right with respect to the orientation of region 58a. Accordingly, the measurement and calculation of reflectance and density of any region is identical to that described for region 58a. It is understood that the color registration test pattern 58 of the present invention is not limited to the sequence and positioning of the regions (58a, 58b, 58c, 58d) shown in FIGS. 3, 4, and 9. On the contrary, it is intended for the present invention to apply to all alternatives, modifications, and equivalents of the color registration test pattern 58 as may be included within the spirit and scope of this description and the appended claims.

In summary, where the optical sensor 42 provides the controller 16 with reflectance measurements, the controller 16 receives four measurements ($R_{avg\ 58a}$, $R_{avg\ 58b}$, $R_{avg\ 58c}$, $R_{avg\ 58d}$), one for each region (58a, 58b, 58c, 58d) of the test pattern 58. Where the controller 16 uses the complementary region (e.g., 58a or 58b) of the test pattern 58 as the reference for measurements in the cross-process direction, the controller 16 performs two calculations using equation (21) to estimate the registration error between the non-black color printed in the test pattern and black. The first calculation inserts the two measurements ($R_{avg\ 58a}$, $R_{avg\ 58b}$) for cross-process registration (Dr') in equation (21). In one technique, the processor inserts the measurement of the negative cross-process region ($R_{avg\ 58a}$) in the $R_{avg,\ x=0}$ term of the numerator, the measurement of the positive cross-process region ($R_{avg\ 58b}$) in the $R_{avg,\ x>0}$ term, and the cross-process measurement with the lowest reflectance ($R_{avg\ min(58a,\ 58b)}$) in the $R_{avg,\ x=0}$ term of the denominator. In this technique, the resulting sign of the calculation matches the direction of the estimated registration error. In a second technique, the processor 16 inserts the cross-process measurement with the lowest reflectance ($R_{avg\ min(58a,\ 58b)}$) in the $R_{avg,\ x=0}$ term of the numerator, the cross-process measurement with the highest reflectance ($R_{avg\ max(58a,\ 58b)}$) in the $R_{avg,\ x>0}$ term, and the cross-process measurement with the lowest reflectance ($R_{avg\ min(58a,\ 58b)}$) in the $R_{avg,\ x=0}$ term of the denominator. In this technique, the processor 16 determines the direction of the estimated registration error from knowing which measurement is the highest (e.g., if $R_{avg\ 58a}$ is the highest measurement there is a negative cross-process registration error; alternatively, if $R_{avg\ 58b}$ is the highest measurement there is a positive cross-process registration error). The processor 16 performs the second calculation using equation (21) and the two measurements ($R_{avg\ 58c}$, $R_{avg\ 58d}$) for process registration (Dr) in the same manner. Likewise, where the optical sensor 42 provides the controller 16 with density measurements, the controller 16 performs two calculations in the same manner, except the four measurements ($D_{avg\ 58a}$, $D_{avg\ 58b}$, $D_{avg\ 58c}$, $D_{avg\ 58d}$) are density measurements and are inserted in equation (22).

Summarizing the alternate method where the controller 16 uses the stored known value for perfect registration of the region (e.g., 58a) of the test pattern 58 as the reference for measurements, the controller 16 performs four calculations using equation (21) to estimate the registration error between the non-black color printed in the test pattern and black. Where the optical sensor 42 provides the controller 16 with reflectance measurements, the controller 16 receives four measurements ($R_{avg\ 58a}$, $R_{avg\ 58b}$, $R_{avg\ 58c}$, $R_{avg\ 58d}$), one for each region (58a, 58b, 58c, 58d) of the test pattern 58. In the first calculation, the processor 16 inserts the negative cross-process measurement ($R_{avg\ 58a}$) in the $R_{avg,\ x>0}$ term and the stored known value for perfect registration of the region (58a) in the $R_{avg,\ x=0}$ terms of equation (21). The processor 16 knows the direction of the registration error based on the region (e.g., negative cross-process registration error for 58a). The processor 16 performs the second, third, and fourth calculations using equation (21) and the three measurements ($R_{avg\ 58b}$, $R_{avg\ 58c}$, $R_{avg\ 58d}$), respectively, in the same manner. Likewise, where the optical sensor 42 provides the controller 16 with density measurements, the controller 16 performs four calculations in the same manner, except the four measurements ($D_{avg\ 58a}$, $D_{avg\ 58b}$, $D_{avg\ 58c}$, $D_{avg\ 58d}$) are density measurements and are inserted in equation (22).

Note that three-color registration test patterns are shown in FIGS. 3 and 4 because the embodiments of the marking platform 10 described in reference to the drawings included three non-black color separations (e.g., yellow, magenta, and cyan). In alternate embodiments, one color registration test pattern 58 would be necessary to measure color registration and determine registration error for each non-black color separation implemented in the marking platform 10. When multiple color registration test patterns 58 are utilized, as in FIGS. 3 and 4, each color registration test pattern is constructed in the same manner. Accordingly, the measurement of color registration and determining registration error from the color registration test pattern in any non-black color separation is identical to that described generically and to that described specifically for magenta. It is understood that the color registration test pattern 58 of the present invention is not limited to yellow, magenta, cyan, or any other individual color separation. On the contrary, it is intended for the present invention to apply to all non-black color separations.

It is, therefore, apparent that there has been provided in accordance with the present invention, a method for measuring color registration and determining registration error in the several embodiments of the marking platforms described herein. While this invention has been described in conjunction with the several embodiments, it is evident that many alternatives, modifications, and variations will be apparent to those skilled in the art. Accordingly, it is intended to embrace all such alternatives, modifications and variations that fall within the spirit and broad scope of the appended claims.

Having thus described several embodiments, the present invention is now claimed to be:

1. A method of measuring registration in a multicolor marking platform comprising the following steps:
   a) marking a first region of a test pattern and a second region of a test pattern on an image receiving member using a black marking material representing a black color separation and a non-black color marking material representing a non-black color separation;
   b) illuminating the first region with a light source and detecting the reflected light rays;
   c) illuminating the second region with the light source and detecting the reflected light rays; and,
   d) determining the registration between the non-black color separation and the black color separation by comparing the light rays reflected by the first region to the light rays reflected by the second region.

2. The method of measuring registration in a multicolor marking platform as set forth in claim 1, wherein step d) further includes the following steps:
  e) converting the detected light rays from the first region to a first signal indicative of the reflectance of the first region;
  f) converting the detected light rays from the second region to a second signal indicative of the reflectance of the first region; and
  g) determining whether or not the non-black color separation and black color separation are in proper registration with each other by comparing the first signal and second signal to each other.

3. The method of measuring registration in a multicolor marking platform as set forth in claim 2, further comprising the following step:
  h) estimating an amount of registration error when the non-black color separation and black color separation are not in proper registration with each other.

4. The method of measuring registration in a multicolor marking platform as set forth in claim 3, wherein step h) further includes the following step:
  i) estimating the amount of registration error according to the equation $x=(2a\,(R_{avg,\,x>0}-R_{avg,\,x=0}))/(1-R_{avg,\,x=0})^2$, wherein:
    a is the width of a black bar in the first region and second region;
    $R_{avg,\,x>0}$ is a value representing the reflectance of the first region;
    $R_{avg,\,x=0}$ is a value representing the reflectance of the second region; and,
    x is the estimated registration error.

5. The method of measuring registration in a multicolor marking platform as set forth in claim 1, wherein step d) further includes the following steps:
  e) converting the detected light rays from the first region to a first signal indicative of the density of the first region;
  f) converting the detected light rays from the second region to a second signal indicative of the density of the first region; and
  g) determining whether the non-black color separation and the black color separation are in proper registration with each other by comparing the first signal and second signal to each other.

6. The method of measuring registration in a multicolor marking platform as set forth in claim 5, further comprising the following step:
  h) estimating an amount of registration error when the non-black color separation is not in proper registration with the black color separation.

7. The method of measuring registration in a multicolor marking platform as set forth in claim 6, wherein step h) further includes the following step:
  i) estimating the amount of registration error according to the equation $x=(2a\,(10^{-De}-10^{-Dr}))/(1-10^{-Dr})^2$, wherein:
    a is the width of a black bar in the first region and second region;
    De is a value representing the density of the first region;
    Dr is a value representing the density of the second region; and,
    x is the estimated registration error.

8. The method of measuring registration in a multicolor marking platform as set forth in claim 1, wherein step a) further includes the following steps:
  e) marking a third region and a fourth region of the test pattern on the image receiving member using the black marking material and the non-black color marking material; and,
further comprising the following steps:
  f) illuminating the third region with the light source and detecting the reflected light rays;
  g) illuminating the fourth region with the light source and detecting the reflected light rays; and,
  h) determining the registration between the non-black color separation and the black color separation in a direction perpendicular to that determined in step d) by comparing the light rays reflected by the third region to the light rays reflected by the fourth region.

9. The method of measuring registration in a multicolor marking platform as set forth in claim 8, wherein step a) and step e) further includes the following steps for marking each region of the test pattern:
  i) marking a plurality of parallel black bars and a plurality of parallel non-black color bars in separate steps but in any order, wherein:
    each black bar is of about equal width and about equally spaced from each other;
    the spacing between each black bar is about equal to the width of each black bar;
    each non-black color bar is of about equal width and equally spaced from each other;
    the width of the non-black color bar is about 1.5 times the width of the black bar;
    the spacing between each non-black color bar is about 0.5 times the width of the black bar; and,
    the plurality of parallel black bars and the plurality of parallel non-black color bars are positioned such that the right edge of the right most non-black color bar mates with the left edge of the right most black bar.

10. The method of measuring registration in a multicolor marking platform as set forth in claim 9, wherein step a) further includes the following step:
  j) marking the second region at about a 180 degree rotation in reference to the first region; and,
wherein step e) further includes the following steps:
  k) marking the third region at about a 90 degree rotation in reference to the first region; and,
  l) marking the fourth region at about a 270 degree rotation in reference to the first region.

11. The method of measuring registration in a multicolor marking platform as set forth in claim 8, wherein the light source used in steps b), c), f), and g) illuminates the region with light rays that are a complementary color to the non-black color separation.

12. The method of measuring registration in a multicolor marking platform as set forth in claim 8, wherein the detecting in steps b), c), f), and g) is accomplished by a sensor with a filter that is a complementary color to the non-black color separation.

13. A method of measuring registration in a multicolor marking platform comprising the following steps:
  a) marking a first region of a test pattern on an image receiving member using a black marking material representing a black color separation and a non-black color marking material representing a non-black color separation;
  b) illuminating the first region with a light source and detecting the reflected light rays; and,
  c) determining the registration between the non-black color separation and the black color separation by comparing the light rays reflected by the first region to a first stored known reference value.

14. The method of measuring registration in a multicolor marking platform as set forth in claim 13, wherein step c) further includes the following steps:
   d) converting the detected light rays from the first region to a signal indicative of the reflectance of the first region; and,
   e) determining whether the non-black color separation and the black color separation are in proper registration with each other by comparing the signal and the first stored known reference value, wherein the first stored known reference value represents a condition when the non-black color separation and the black color separation are in proper registration with each other.

15. The method of measuring registration in a multicolor marking platform as set forth in claim 14, further comprising the following step:
   f) estimating an amount of registration error when the non-black color separation and black color separation are not in proper registration with each other.

16. The method of measuring registration in a multicolor marking platform as set forth in claim 15, wherein step f) further includes the following step:
   g) estimating the amount of registration error according to the equation $x=(2a\ (R_{avg,\ x>0}-R_{avg,\ x=0}))/(1-R_{avg,\ x=0})^2$, wherein:
      a is the width of a black bar in the first region and second region;
      $R_{avg,\ x>0}$ is a value representing the reflectance of the first region;
      $R_{avg,\ x=0}$ is the first stored known reference value; and,
      x is the estimated registration error.

17. The method of measuring registration in a multicolor marking platform as set forth in claim 13, wherein step c) further includes the following steps:
   d) converting the detected light rays from the first region to a signal indicative of the density of the first region; and,
   e) determining whether the non-black color separation and the black color separation are in proper registration with each other by comparing the signal and the first stored known reference value, wherein the first stored known reference value represents a condition when the non-black color separation and the black color separation are in proper registration with each other.

18. The method of measuring registration in a multicolor marking platform as set forth in claim 17, further comprising the following step:
   f) estimating an amount of registration error when the non-black color separation is not in proper registration with the black color separation.

19. The method of measuring registration in a multicolor marking platform as set forth in claim 18, wherein step f) further includes the following step:
   g) estimating the amount of registration error according to the equation $x=(2a\ (10^{-De}-10^{-Dr}))/(1-10^{-Dr})^2$, wherein:
      a is the width of a black bar in the first region and second region;
      De is a value representing the density of the first region;
      Dr is the first stored known reference value; and,
      x is the estimated registration error.

20. The method of measuring registration in a multicolor marking platform as set forth in claim 13, wherein step a) further includes the following steps:
   d) marking a second region, a third region, and a fourth region of the test pattern on the image receiving member using the black marking material and the non-black color marking material; and,
further comprising the following steps:
   e) illuminating the second region with the light source and detecting the reflected light rays;
   f) determining the registration between the non-black color separation and the black color separation in a direction opposite to that determined in step c) by comparing the light rays reflected by the second region to a second stored known reference value;
   g) illuminating the third region with the light source and detecting the reflected light rays;
   h) determining the registration between the non-black color separation and the black color separation in a direction perpendicular to that determined in step c) by comparing the light rays reflected by the third region to a third stored known reference value;
   i) illuminating the fourth region with the light source and detecting the reflected light rays; and,
   j) determining the registration between the non-black color separation and the black color separation in a direction opposite to that determined in step h) by comparing the light rays reflected by the second region to a second stored known reference value.

21. The method of measuring registration in a multicolor marking platform as set forth in claim 20, wherein step a) and step d) further includes the following steps for marking each region of the test pattern:
   k) marking a plurality of parallel black bars and a plurality of parallel non-black color bars in separate steps but in any order, wherein:
      each black bar is of about equal width and about equally spaced from each other;
      the spacing between each black bar is about equal to the width of each black bar;
      each non-black color bar is of about equal width and equally spaced from each other;
      the width of the non-black color bar is about 1.5 times the width of the black bar;
      the spacing between each non-black color bar is about 0.5 times the width of the black bar; and,
      the plurality of parallel black bars and the plurality of parallel non-black color bars are positioned such that the right edge of the right most non-black color bar mates with the left edge of the right most black bar.

22. The method of measuring registration in a multicolor marking platform as set forth in claim 21, wherein step d) further includes the following steps:
   l) marking the second region at about a 180 degree rotation in reference to the first region;
   m) marking the third region at about a 90 degree rotation in reference to the first region; and,
   n) marking the fourth region at about a 270 degree rotation in reference to the first region.

23. The method of measuring registration in a multicolor marking platform as set forth in claim 20, wherein the light source used in steps b), e), g), and i) illuminates the region with light rays that are a complementary color to the non-black color separation.

24. The method of measuring registration in a multicolor marking platform as set forth in claim 20, wherein detecting in steps b), e), g), and i) is accomplished by a sensor with a filter that is a complementary color to the non-black color separation.

25. An image registration detection system in a multicolor marking platform comprising:
- an image marking member for marking a plurality of marking materials, each marking material representing a different color separation;
- an image receiving member for receiving a plurality of marking materials;
- a controller for controlling the marking of a plurality of test patterns on the image receiving member, each test pattern including two marking materials disposed to indicate a registration relative to the different color separations; and,
- a sensor for measuring the light rays reflected by any one of the plurality of test patterns at an angle to a light source illuminating said test pattern.

26. The image registration detection system as set forth in claim 25, wherein the controller is for determining the registration of the two color separations to each other from the measurement performed by the sensor.

27. The image registration detection system as set forth in claim 25, wherein the sensor is for measuring the reflectance of any one of the plurality of test patterns.

28. The image registration detection system as set forth in claim 25, wherein the sensor is for measuring the density of any one of the plurality of test patterns.

29. The image registration detection system as set forth in claim 25, wherein the image receiving member is a transferred target substrate.

30. An image registration detection system in an electrophotographic multicolor marking platform comprising:
- a controller for controlling the marking of a plurality of test patterns on an image receiving member, each test pattern including two marking materials disposed to indicate a registration relative to the different color separations;
- a marking engine for marking a plurality of marking materials, each marking material representing a different color separation;
- an image receiving member for receiving a plurality of marking materials; and,
- a sensor for measuring the light rays reflected by any one of the plurality of test patterns at an angle to a light source illuminating said test pattern.

31. The image registration detection system as set forth in claim 30, wherein the image receiving member is a fused target substrate in a xerographic environment.

* * * * *

UNITED STATES PATENT AND TRADEMARK OFFICE
CERTIFICATE OF CORRECTION

PATENT NO.     : 6,493,083 B2
DATED          : December 10, 2002
INVENTOR(S)    : Michael A. Parisi and Michael P. Dirkx It is certified that error appears in the above-identified patent and that said Letters Patent is hereby corrected as shown below:

On Drawing Sheet 5 of 9, replace Figure 5b to correct alignment of items 68 and 70 for consistency with Figures 6, 7a, and 7b.

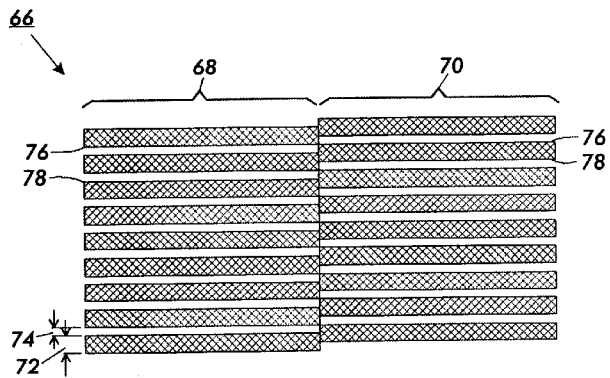

FIG. 5b

Column 12,
Line 7, delete "very thin".

Signed and Sealed this

Twelfth Day of August, 2003

JAMES E. ROGAN
*Director of the United States Patent and Trademark Office*